United States Patent [19]
Miller et al.

[11] Patent Number: 6,152,159
[45] Date of Patent: Nov. 28, 2000

[54] VALVE ASSEMBLY AND METHOD FOR USE IN DELIVERY OF MOLTEN METAL

[75] Inventors: Norman L. Miller, Huber Heights; Richard L. Schaefer, Dayton, both of Ohio

[73] Assignee: Frank W. Schaefer, Inc., Dayton, Ohio

[21] Appl. No.: 08/783,227

[22] Filed: Jan. 14, 1997

[51] Int. Cl.$^7$ ...................................................... F16L 7/00
[52] U.S. Cl. ............................ 137/15; 137/375; 251/318; 251/356; 251/368
[58] Field of Search ...................... 137/375, 15; 251/156, 251/88, 356, 359, 368, 318, 322

[56] References Cited

U.S. PATENT DOCUMENTS

| | | | |
|---|---|---|---|
| Re. 27,945 | 3/1974 | Hunt et al. ............................ | 164/250 |
| 1,981,825 | 11/1934 | Miller, Jr. ............................ | 251/155 |
| 2,352,799 | 7/1944 | Newton ................................ | 251/156 |
| 3,027,874 | 4/1962 | Burkett ................................ | 251/359 |
| 3,032,841 | 5/1962 | Sylvester ............................. | 22/69 |
| 3,044,489 | 7/1962 | Raub et al. ......................... | 137/556.3 |
| 3,049,332 | 9/1962 | Webster .............................. | 251/88 |
| 3,052,257 | 9/1962 | Bartlett ............................... | 251/88 |
| 3,529,805 | 9/1970 | Callahan ............................. | 251/88 |
| 3,552,478 | 1/1971 | Lauener ............................. | 164/64 |
| 4,277,539 | 7/1981 | Keller et al. ....................... | 428/450 |
| 5,022,458 | 6/1991 | Smith ................................. | 164/457 |
| 5,346,394 | 9/1994 | DeStefanis ......................... | 433/32 |
| 5,435,348 | 7/1995 | Nakamura et al. ............... | 137/625.17 |
| 5,590,681 | 1/1997 | Schaefer et al. ................... | 137/375 |

FOREIGN PATENT DOCUMENTS

| | | |
|---|---|---|
| 916860 | 12/1946 | France . |
| 876751 | 5/1953 | Germany . |
| 1151357 | 7/1963 | Germany . |
| 39-23717 | 10/1939 | Japan . |
| 62-45463 | 2/1987 | Japan . |
| 1001979 | 8/1965 | United Kingdom . |
| 1171295 | 11/1969 | United Kingdom . |
| WO 80/00317 | 3/1980 | WIPO . |
| WO 95/01236 | 1/1995 | WIPO . |

*Primary Examiner*—A. Michael Chambers
*Attorney, Agent, or Firm*—Roger S. Dybvig

[57] ABSTRACT

A plunger-style valve assembly for use in a launder system of a machine for casting parts made from molten aluminum or other metal comprises a valve body having a longitudinally-extending inlet passageway and a longitudinally-extending outlet passageway which communicate with one another through a valve port centered about a vertical axis. A raised circular valve seat defines the valve port, and a vertically-movable valve element is aligned with the valve port and the valve seat. The valve element has a resilient, heat-resistant sealing member secured to the lower end thereof. The valve element can be raised or lowered so that the resilient sealing member moves into and out of engagement with the raised valve seat, thereby controlling the flow of molten aluminum from the valve body inlet passageway to the valve body outlet passageway through the valve port.

41 Claims, 8 Drawing Sheets

VALVE ASSEMBLY AND METHOD FOR USE IN DELIVERY OF MOLTEN METAL

INCORPORATION BY REFERENCE

The disclosure of commonly-owned U.S. Pat. No. 5,590,681, issued Jan. 7, 1997, is hereby incorporated herein by reference.

FIELD OF THE INVENTION

This invention relates to a plunger-style valve assembly particularly suited for use in the low pressure casting of parts made from aluminum and aluminum alloys, although this invention is also suitable for use in non-pressurized casting. (For convenience, the word "aluminum" is used hereafter to refer to aluminum and aluminum alloys.) In addition, those familiar with metal casting will recognize that this invention is also useful in producing parts made from non-ferrous metals other than aluminum, such as zinc, bronze, brass, and magnesium.

BACKGROUND OF THE INVENTION

A conventional low pressure casting machine comprises a holding furnace having a holding chamber substantially filled with a pool of molten metal and a vented mold or other molten metal-receiving member mounted on top of a pressure-tight furnace lid or cover. The mold or other molten metal-receiving member is mounted on a fixture that is in communication with a riser tube that extends through the furnace lid and into the pool of molten metal. A gas under pressure is introduced into the holding furnace chamber above the molten metal pool whereupon the molten metal flows upwardly through the riser tube into the mold. Such machines are called "low pressure" casting machines because the pressure exerted on top of the metal pool within the holding furnace is only on the order of three to ten pounds per square inch above atmosphere.

Low pressure casting processes are essentially non-turbulent. Since molten aluminum which has been agitated, particularly in air, is less dense and of lower quality because of higher levels of oxide inclusions than metal which has not been agitated, parts produced by low pressure casting processes are often denser and of higher quality than parts produced by other casting operations.

Although there is minimal agitation of the aluminum during a low pressure casting operation, a problem is encountered with many known low pressure aluminum casting operations because there is no satisfactory way to deliver molten metal to the low pressure holding furnace which does not cause the molten metal to be exposed to air and agitated during the delivery process. To fill a low pressure holding furnace with molten metal, molten metal which has been transferred out of a metal melting furnace (or a holding furnace located adjacent the low pressure casting machine) is poured into the low pressure holding furnace by a transfer device, such as a ladle. (It will be understood that a melting furnace also serves as a holding vessel.) To do this, it is usually first necessary to open a pressure-tight cover over the holding furnace, transfer the molten metal into the holding furnace, and replace the pressure-tight cover. During these operations, the metal is agitated by the transferring and pouring operations so that molten metal in the holding furnace may already be significantly agitated before the casting operations are begun. These are time-consuming and expensive operations which may produce parts having less than the desired quality.

Commonly-owned U.S. Pat. No. 5,590,681, which is incorporated by reference above, discloses a low pressure casting process and apparatus wherein molten aluminum is delivered to a low pressure holding furnace through a launder system connected to a conventional melting furnace (or connected to a separate molten metal holding furnace). A valve assembly is provided in the launder system to selectively deliver molten aluminum from the melting furnace (or separate holding furnace) to the low pressure holding furnace. Typically, such valve assembly includes a rotatable valve element having a longitudinal passageway therethrough which may be aligned with passageways in the launder system leading to the low pressure holding furnace. To seal the low pressure holding furnace during a casting cycle, the valve element is rotated to move the passageway through the valve element out of alignment with the passageway leading to the low pressure holding furnace.

As explained in the '681 patent, the valve element is preferably formed from graphite, which is non-wetting and provides excellent resistance to molten aluminum. However, graphite is highly susceptible to oxidization in the high-temperature environment of metal casting. In addition because the rotatable valve element frictionally bears against a valve body during rotation of the valve element, a concern arises regarding deterioration of the valve element, due to friction, if the valve element is formed from graphite. As a result of such deterioration, molten metal may be undesirably forced, i.e. leak, upwardly around the valve element due to the pressure applied to the pool of molten metal in the low pressure holding furnace. Because such leakage of molten metal around the valve element occurs above the level of the molten metal in the valve assembly, the leakage not only presents a potential hazard to persons working around the valve assembly, but may also solidify and cause the valve element to freeze up.

An alternative valve construction disclosed in the '681 patent utilizes a vertically-movable, plunger-style valve element that closes a valve port centered about a vertical axis. The use of a plunger-style valve element is preferable to the aforementioned rotatable valve element in instances where molten aluminum is to be delivered to the low pressure holding furnace at relatively high rates because rotatable valve elements perform best with relatively small valve ports, whereas plunger-style valve elements perform satisfactorily with relatively large valve ports. However, the plunger-style valve disclosed in the '681 patent has certain drawbacks because mating parts of the valve element and the valve port are formed from non-wetting ceramic material. Consequently, the resulting valve seal is formed by the engagement of two hard surfaces, thereby requiring precision manufacturing to obtain a repeatable valve seal.

SUMMARY OF THE INVENTION

An object of this invention is to provide a durable valve assembly for use in delivery of molten metal for casting purposes in which worn parts are easily removed and replaced or repaired without the need to drain molten metal from the valve assembly. A related object is to provide a valve assembly in which the entire valve assembly is easily removed for more extensive repairs or for replacement, as explained in the aforementioned U.S. Pat. No. 5,590,681 patent.

Another object of this invention is to provide a valve assembly for use in molten metal delivery which provides a repeatable valve seal over long periods of use. A related object is to provide a valve assembly in which any leakage around the mating parts of the valve assembly forming the seal occurs below the level of molten metal in the valve assembly.

Yet another object of this invention is to provide a valve assembly achieving the foregoing objects which is highly impervious to the damaging effects of molten aluminum.

A valve assembly in accordance with this invention comprises a valve body having a longitudinally-extending molten metal inlet passageway and a longitudinally-extending molten metal outlet passageway. The valve body further defines a valve port centered about a vertical axis and opening from the inlet passageway to the outlet passageway. A valve element is movable by a drive mechanism along the vertical axis of the valve port between a closed position wherein the valve element closes the valve port and an open position wherein the valve element is spaced from the valve port. The lower end of the valve element is provided with a heat-resistant, resilient sealing member which engages the portion of the valve body defining the valve port when the valve element is in the closed position, thereby creating a seal which prevents the flow of molten metal from the inlet passageway to the outlet passageway through the valve port.

Further in accordance with this invention, the valve port is preferably defined by a raised valve seat which is engaged by the resilient sealing member of the valve element. The engagement between the valve seat and the sealing member compresses the sealing member to provide a good seal. In addition, the valve element may be provided with a hinge or gimbal action whereby the lower end of the valve element is pivotal relative to the upper end of the valve element so that the resilient sealing member automatically seeks proper alignment with the valve seat as parts forming the valve assembly wear over time.

Other objects and advantages of this invention will become apparent from the following description and the accompanying drawings.

DETAILED DESCRIPTION

With reference to FIGS. 1 through 9, a valve assembly, generally designated 20, in accordance with this invention comprises a U-shaped or trough-like valve support, generally designated 22, a valve body, generally designated 24, supported in said valve support 22, and a plunger-style valve element, generally designated 26.

The valve support 22 comprises a metal support casing 27 having ends 28 which mate with cooperating end surfaces of a launder system, as shown and described in the aforementioned U.S. Pat. No. 5,590,681 patent. One, or both, end(s) 28 of the support casing 27 is flared upwardly to ease insertion and removal of the valve assembly 20 from between confronting sections of the launder system. The entire inner surface of the support casing 27 is lined with commercially-available refractory ceramic fiber paper 29. A pair of mutually-spaced support piers 30 made from a rigid insulating non-wetting material, such as high density calcium silicate blocks, are supported on the inside bottom wall and span transversely across the metal valve support casing 27, such support piers 30 providing the primary support for the valve body 24. In addition, the inside bottom wall and the inside sidewalls of the metal casing 27 are lined with high temperature insulating materials 32 that form U-shaped linings covering, along with the support piers 30, the inside bottom and sides of the metal casing 27. The insulating materials 32 may comprise mineral wool, fiberglass, low or high density calcium silicate, or various refractory ceramic fiber or other refractory materials.

Figure 6:
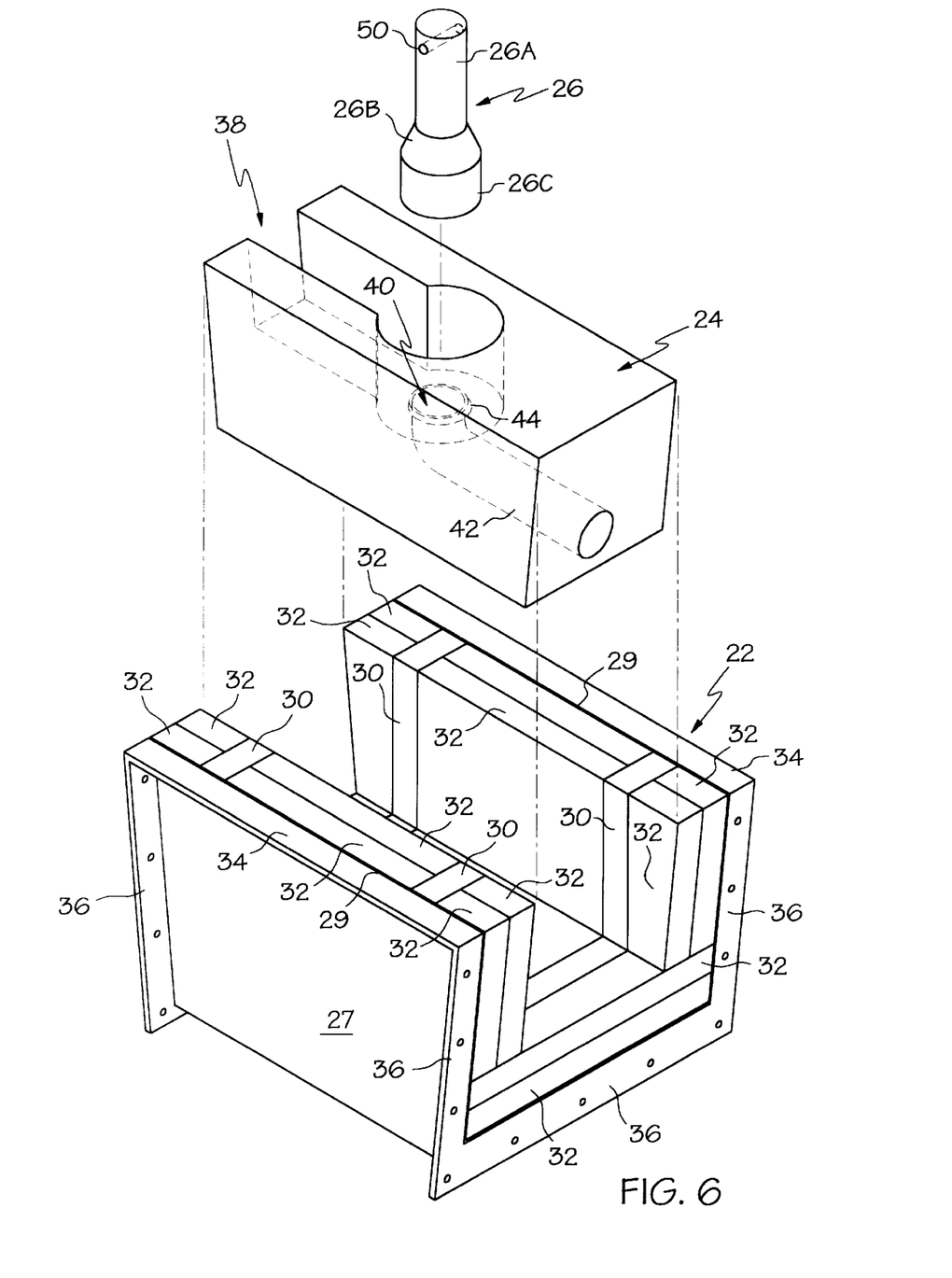
FIG. 6 is a partially-exploded perspective view of the portion of the valve assembly shown in FIGS. 3 through 5.
Figure 7:
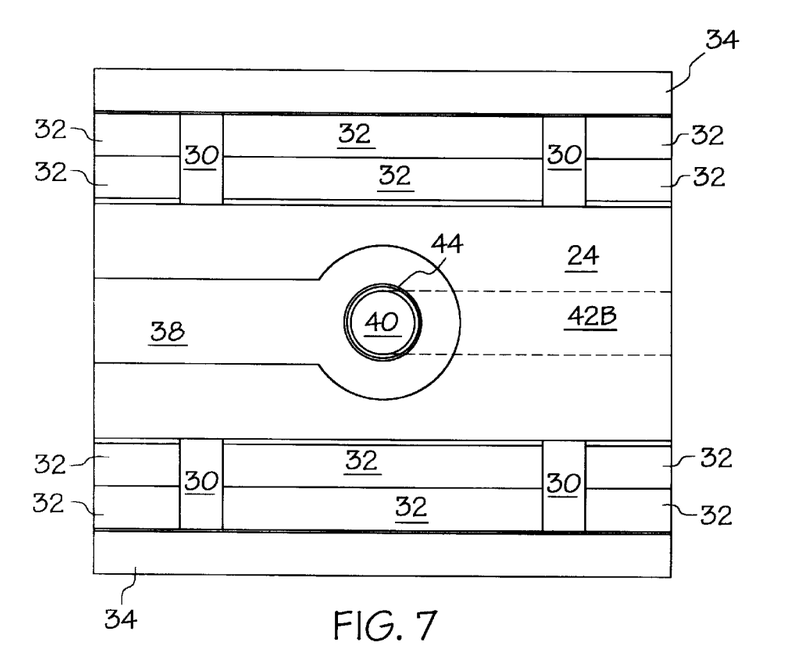
FIG. 7 is a top plan view of a valve support and a valve body forming parts of the valve assembly shown in FIGS. 3 through 6.

The casing 27 also has a pair of parallel mounting flanges 34 extending along its longitudinally-extending top edges and U-shaped mounting flanges 36 bordering its leading and trailing ends 28. The U-shaped mounting flanges 36 are aligned with and connected by bolts to U-shaped flanges projecting from the adjacent ends of the launder sections in the cooperating parts of the launder system, as shown and described in the '681 patent.

The valve body 24 may be formed in a conventional manner, such as casting, for example, from a variety of suitable materials, but a matrix of durable, chemically-bonded, castable refractory material, such as Thermbond Formula Five castable refractory material available from Stellar Materials, Inc., Detroit, Mich., is presently preferred. The valve body 24 has a longitudinally-extending, molten metal inlet channel 38 into which molten metal from the upstream portion of the launder system enters the valve body 24. The molten metal inlet channel 38 communicates through a circular valve port 40 with a longitudinally-extending molten metal outlet conduit 42 formed in the valve body 24, the molten metal outlet conduit 42 opening to the downstream portion of the launder system (not shown). For reasons which will be described below, the valve port is defined by an upstanding flange or valve seat 44, which is preferably integrally formed with and cast from the same castable refractory material used to form the valve body 24. As apparent, molten metal from the upstream portion of the launder system which enters the inlet channel 38 can flow through the valve port 40 into the outlet conduit 42 and then into the downstream portion of the launder system.

Figure 3:
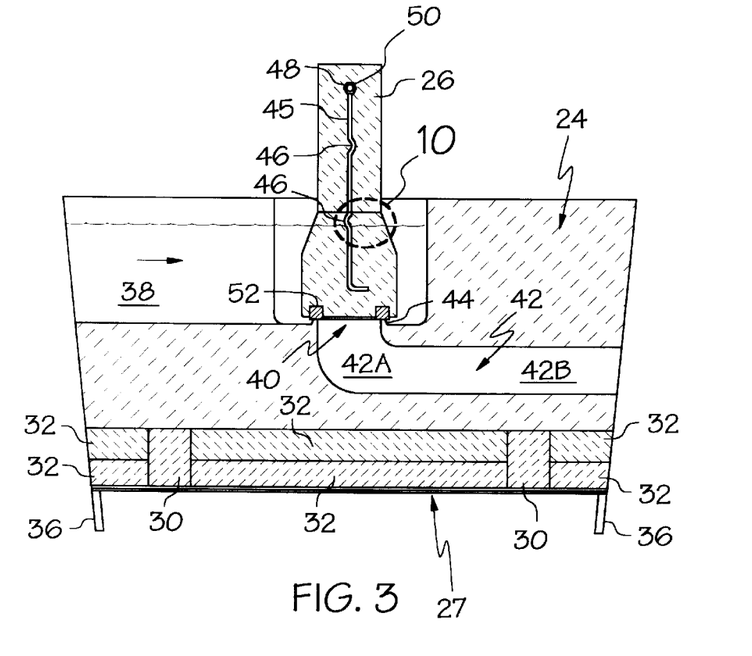
FIG. 3 is a cross-sectional view of a portion of the valve assembly of FIGS. 1 and 2 taken along line 3—3 of FIG. 2. The valve assembly is shown in its closed condition in FIG. 3.
Figure 4:
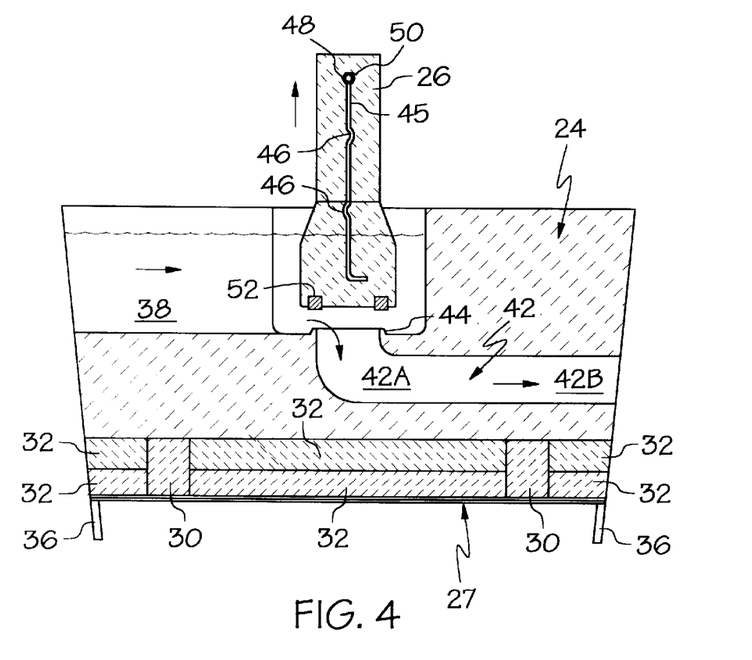
FIG. 4 is a cross-sectional view similar to FIG. 3 but showing the valve assembly in its open condition.

The particular shape and size of the inlet channel 38, the valve port 40, and the outlet conduit 42 are dependent on the particular application in which the valve assembly 20 is used. Thus, although a circular port 40 as shown in the drawings is preferred, it will be understood that the port 40 may be any shape, such as oval, rectangular, or the like. In addition, the port 40 may be any suitable size selected on the basis of the desired flow rate through the valve assembly 20. Likewise, the molten metal outlet conduit 42 has a downwardly-extending portion 42A that opens to a longitudinally-extending portion 42B, the particular shape of the different portions of the outlet conduit 42 typically being determined by the desired flow rate through the valve assembly 20 and the shape of the mating portions of the launder system. Consequently, the different portions of the outlet conduit 42 may be cylindrical, as shown in the drawings, or may be rectangular, oval, or any suitable shape. In addition, the downwardly extending portion 42A of the outlet conduit 42 may advantageously flare along its axis to a larger or smaller diameter, as the case may be, at the junction with the longitudinal portion 42B of the outlet conduit 42. Likewise, the longitudinal portion 42B of the outlet conduit 42 may also be flared.

Figure 8:
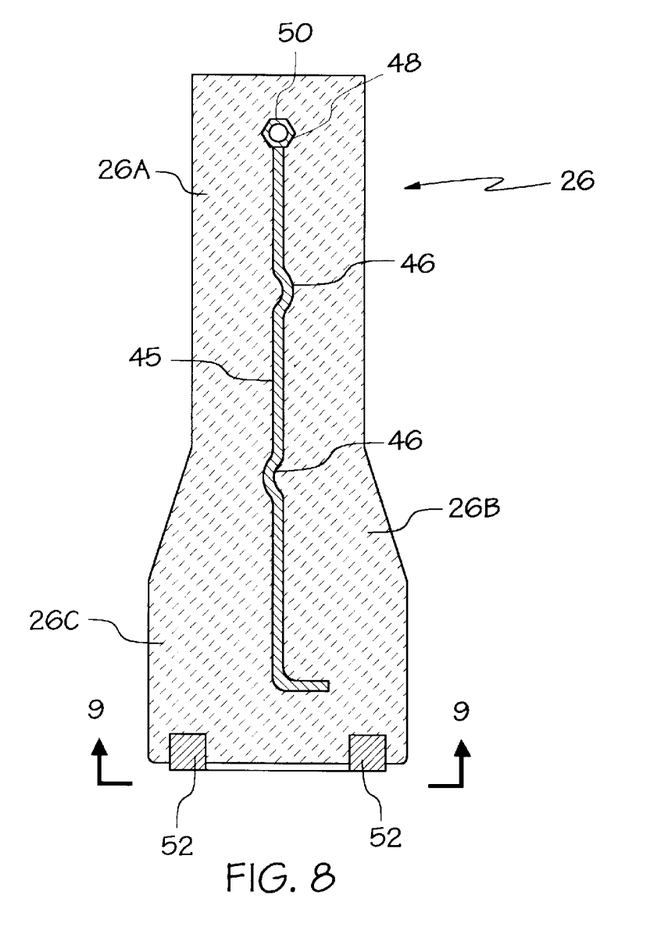
FIG. 8 is vertical cross-sectional view of a valve element forming part of the valve assembly shown in FIGS. 1 through 6.
Figure 9:
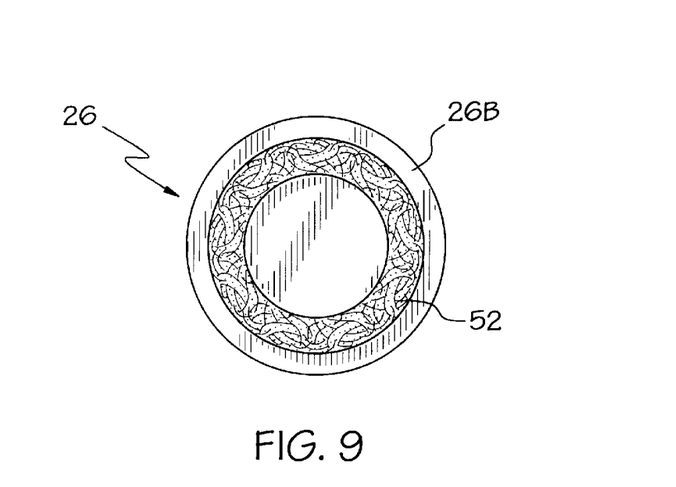
FIG. 9 is a bottom plan view of the valve element of FIG. 8 as viewed in the direction of arrows 9—9 thereof.

With reference particularly to FIGS. 3 through 9, the flow of molten metal through the valve port 40 is controlled by operation of the vertically-movable, plunger-style valve element 26, which is shown by itself in FIGS. 8 and 9. (Here it will be noted that terms such as "vertical" and "horizontal" are used in this description and in the appended claims in a relative, rather than an absolute sense.) The valve element 26 may be formed in a conventional manner from any of a variety of suitable materials, but is preferably formed from a durable, chemically-bonded, castable refractory material such as Thermbond Formula Tabular Course castable refractory material available from the aforementioned Stellar Materials, Inc. Alternatively, the valve element 26 may be formed from other Thermbond materials, such a Formula Tabular Fine, Formula Five, or Formula Seven, or any other suitable material. In this regard, the valve body 24 discussed above may also be formed from the Thermbond Formula Tabular Course, Formula Tabular Fine, or Formula Seven material.

The valve element 26 has a knurled reinforcing rod 45 located therein extending along the axis of the valve element 26. The reinforcing rod 45 is preferably formed from stainless steel or, more advantageously, from titanium, which is highly impervious to the well-known damaging effects of molten aluminum. To anchor the reinforcing rod 45 in the castable refractory used to form the valve element 26, the reinforcing rod 45 is provided with a right angle bend at its lower end and with one or more bends or crimps 46 along its length. In addition, a stainless steel (or titanium) nut or other ring-like structure 48 is welded to the upper end of the reinforcing rod 45, for reasons which will be described below, and aligned with a transverse aperture 50 extending through the valve element 26 near the upper end thereof.

Figure 12:
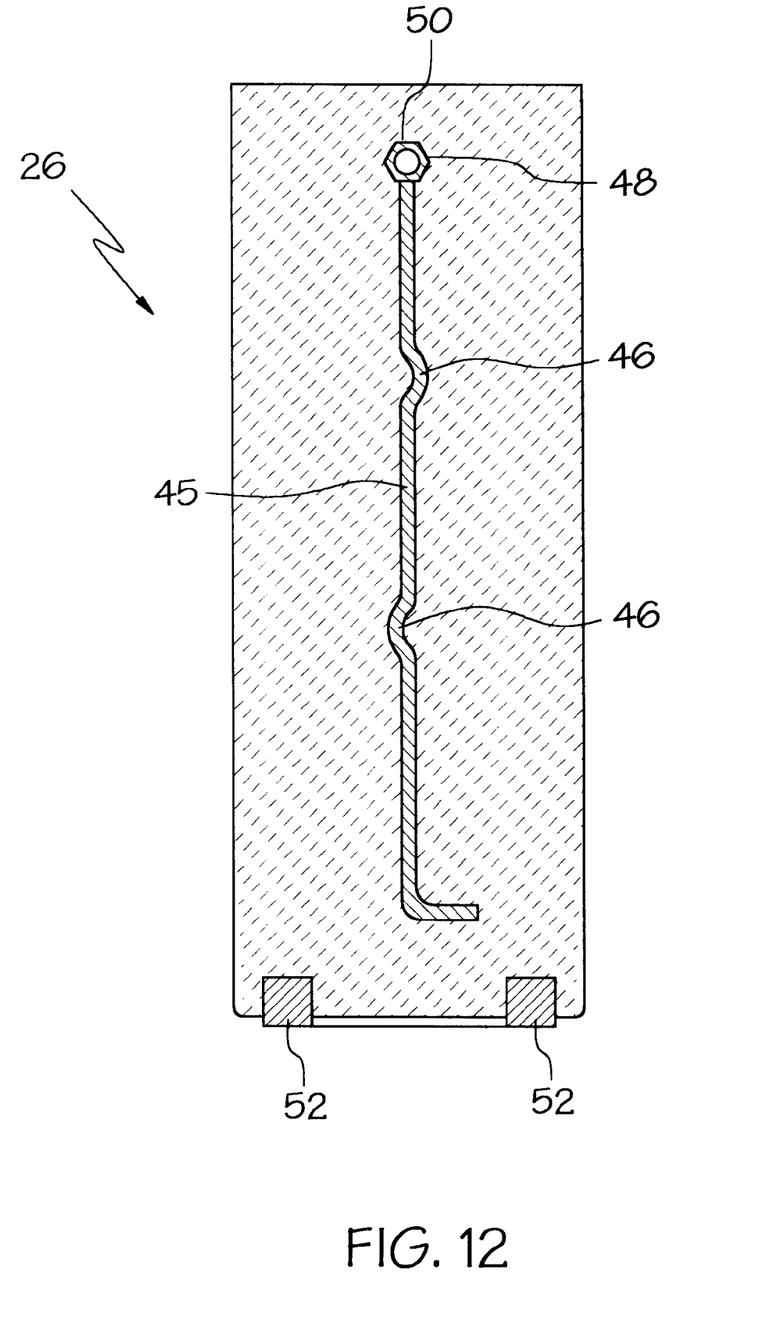
FIG. 12 is a vertical cross-sectional view similar to FIGS. 8 and 11 but showing a third embodiment of a valve element in accordance with this invention.

With reference particularly to FIGS. 8 and 9, the illustrated valve element 26 is formed by three integral sections, namely a upper cylindrical shaft section 26A, a medial conical section 26B, and a lower cylindrical valving section 26C. Here, it will be noted that the different sections of the valve element 26 need not be formed from the same material, and it is contemplated that the shaft section 26A of the valve element 26 may, as an example, be formed from the aforementioned Thermbond Formula Seven material, whereas the medial section 26B and the valving section 26C of the valve element 26 may, for example, be formed from the aforementioned Thermbond Formula Tabular Course material. The configuration of the valve element 26 illustrated in FIGS. 8 and 9 reduces heat transfer along the valve element 26, but it may be desirable in certain applications, such as relatively small valve assemblies, to form the entire valve element 26 in the shape of a right circular cylinder, as shown in FIG. 12. Of course, valve elements 26 having other non-circular cross-sectional shapes could also be used.

In accordance with this invention, the valving section 26C of the valve element 26 is provided with a sealing ring 52 made from resilient, heat-resistant material, which should be non-wetting, especially for use with molten aluminum. Commercially-available ⅝" square ceramic fiber braid rope, which is soft and pliable, is presently preferred for forming the sealing ring 52, but the use of graphite impregnated resilient material is also contemplated. Preferably, the sealing ring 52 is secured in and projects slightly from a recessed channel in the valve element 26. The sealing ring 52 may be press fit into the channel in the valve element 26, which is slightly narrower than the sealing ring 52, and the sidewalls of the channel may be formed with a slight negative draft from the bottom end of the valve element 26 to help secure the sealing ring 52. In addition or alternatively, a suitable cement may be used to secure the sealing ring 52.

Figure 5:
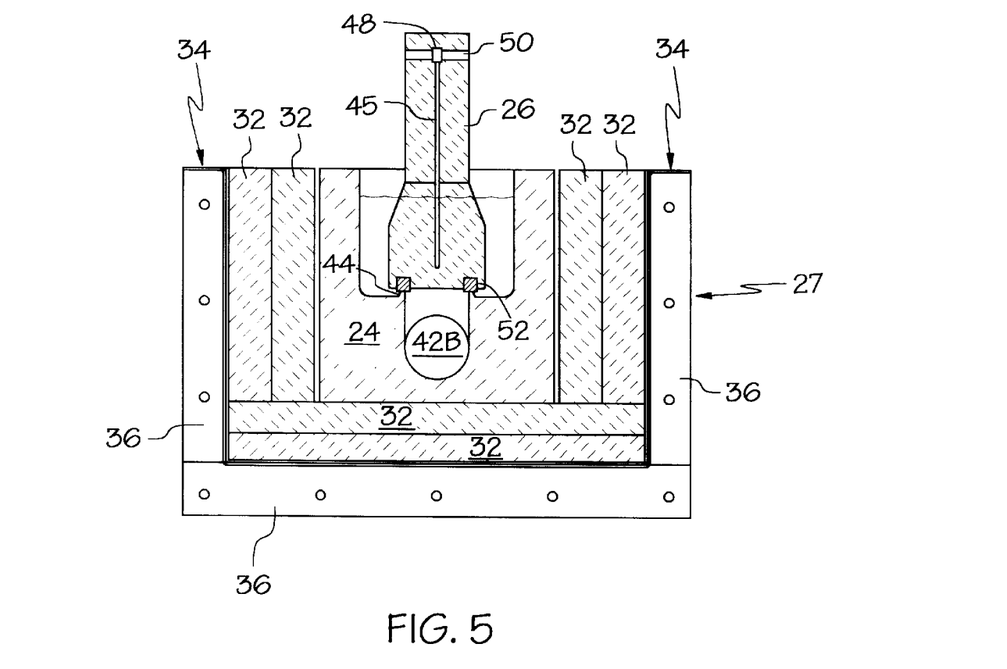
FIG. 5 is an cross-sectional view of the portion of the valve assembly shown in FIG. 3 taken along line 5—5 of FIG. 1.

When the valve element 26 is lowered to close the valve port 40, as shown in FIG. 3 and 5, the sealing ring engages the valve seat 44 defining the valve port 40, which compresses the sealing ring 52 in the channel formed in the valve element 26, and although not shown in the drawings, a marginal upper portion of the valve seat 44 is received within the channel in the valve element 26. The engagement between the resilient sealing ring 52 and the valve seat 44 positively closes the valve port 40, as shown in FIGS. 3 and 5, to prevent the flow of molten metal from the inlet channel 38 to the outlet conduit 42 in the valve body 24. The valve element 26 can then be lifted away from the valve seat 44, as shown in FIG. 4, thereby opening the valve port 40, to permit the flow of molten metal into the outlet conduit 42 in the valve body 24 and into the downstream portion of the launder system.

Figure 1:
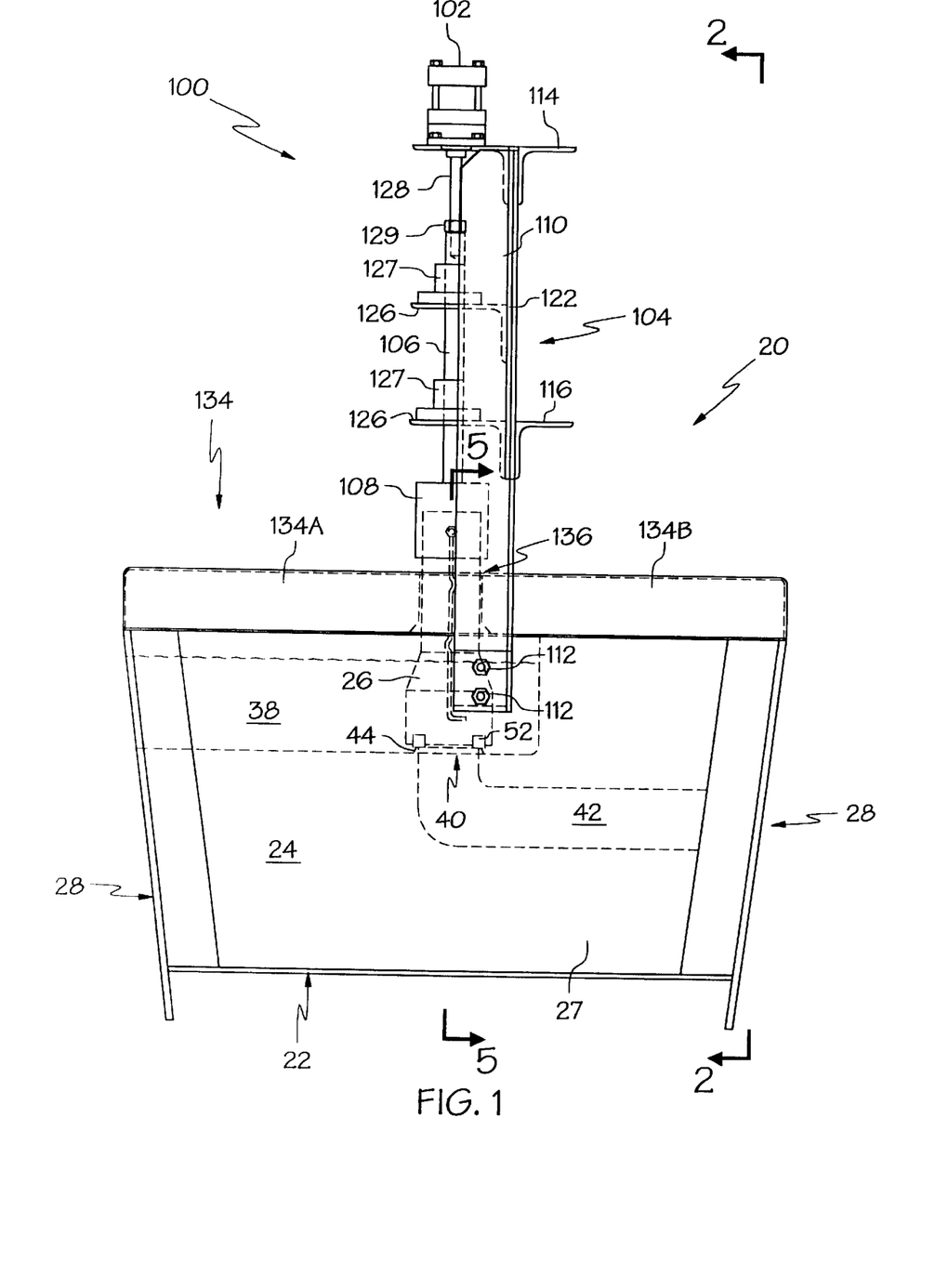
FIG. 1 is a side elevational view of a valve assembly in accordance with this invention, with internal or otherwise hidden parts shown in broken lines.
Figure 2:
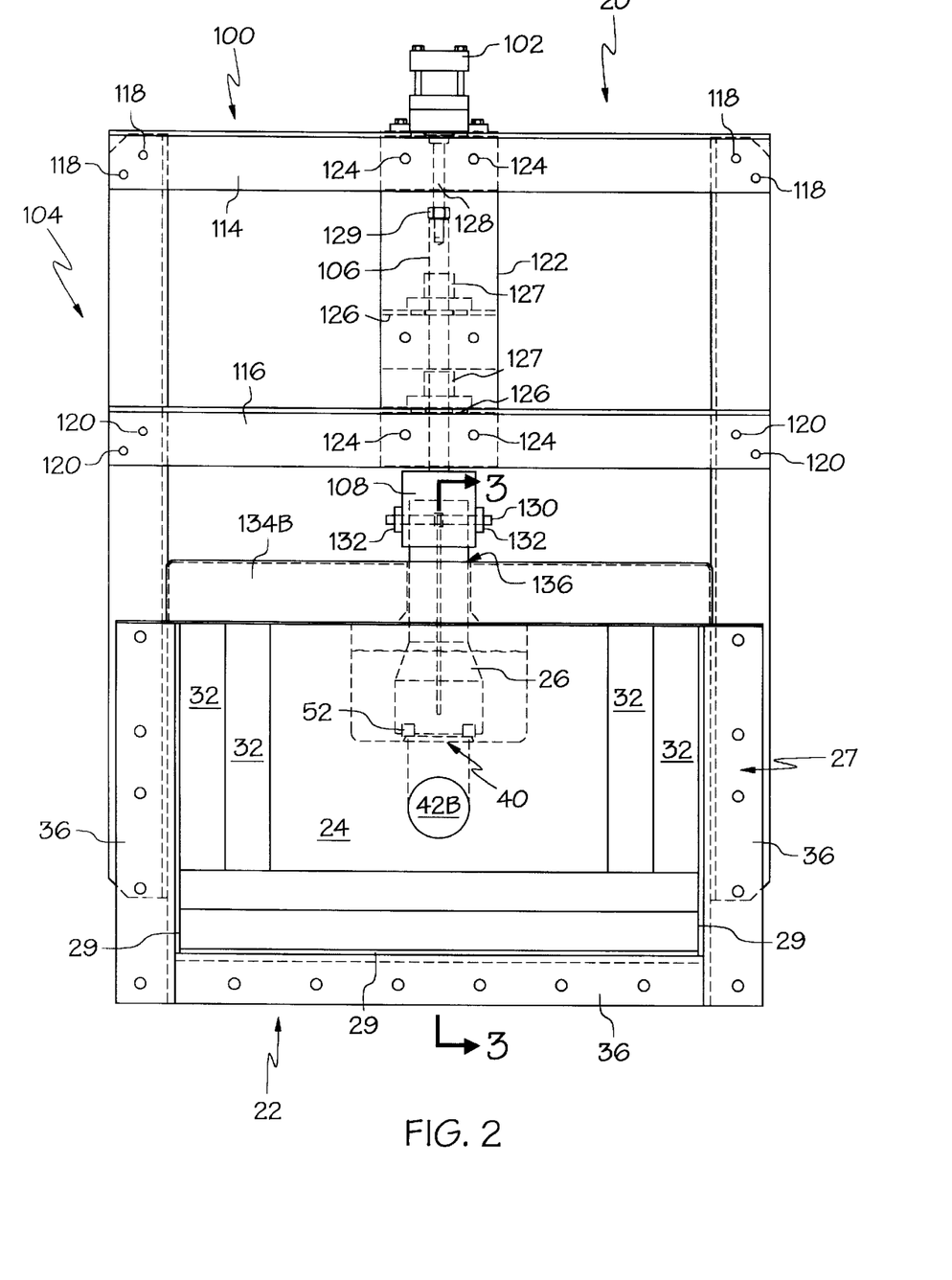
FIG. 2 is an end elevational view of the valve assembly of FIG. 1 as viewed in the direction on arrows 2—2 thereof.

With reference to FIGS. 1 and 2, the valve element 26 is driven toward and away from the valve port 40 by a drive mechanism, generally designated 100. The drive mechanism 100 may be of any suitable construction which accurately maintains the valve element 26 in alignment with the valve port 40, and one such drive mechanism 100 is illustrated in FIGS. 1 and 2. The illustrated drive mechanism 100 generally comprises a commercially-available actuator 102 mounted on a support structure, generally designated 104. The actuator 102 may be any suitable actuator, such as an air actuator as shown, but a hydraulic or electric actuator might also be used. Using conventional controls, the actuator 102 drives a tool steel rod 106 connected to the valve element 26 by way of a cylindrical tool steel collar 108. Because the machine controls may be entirely conventional and form no part of this invention, they are not discussed in detail herein. However, a pair of commercially-available proximity sensors (not shown) are preferably located adjacent the output shaft 128 of the actuator 102 to indicate when the output shaft is fully extended or fully withdrawn.

The support structure 104 comprises a pair of angle-iron support brackets 110—one secured to each side of the valve casing 27 by two bolts 112. An upper angle-iron cross member 114 and a lower angle-iron cross member 116 span between the support brackets 110 and are connected thereto by bolts 118 and 120, respectively. A vertical support member 122 extends between the cross members 114 and 116 parallel to the axis of the valve port 40 and is similarly connected to the cross members 114 and 116 by bolts 124. The vertical support member 122 has bolted thereto two bearing supports 126 formed from angle iron, each having mounted thereon a commercially-available linear bearing 127 which confines the rod 106 and maintains the rod 106 in proper alignment with the axis of the valve port 40.

In addition to the bolt connections between the various parts of the support structure 104 and the valve casing 27, it is also preferable to make welded connections between parts, which adds rigidity to the support structure 104.

The actuator 102, which may have a short stoke on the order of 3", is mounted atop the upper cross member 114 so that its output shaft 128 extends along the axis of the valve port 40. The output shaft 128 is connected by a commercially-available alignment coupling 129 to the rod 106 which extends into and is welded to the collar 108. The collar 108 has a downwardly-facing, cylindrical socket which is sized to snugly receive the upper end of the shaft section 26A of the valve element 26 and has a pair of apertures through the outer wall thereof that are aligned with the transverse aperture 50 in the valve element 26. A connecting pin 130 extends through the apertures in the collar 108 and through the aperture 50 in the valve element (and through the nut 48), thereby drivingly connecting the valve element 26 to the collar 108 and, ultimately, to the output shaft 128 of the actuator 102. The connecting pin 130 is threaded at each end, and a pair of nuts 132 secures the connecting pin to the collar 108 and the valve element 26.

The top of the valve casing 27 is covered by an insulated lid assembly, generally designated 134, which defines a circular opening 136 through which the shaft section 26A of the valve element 26 extends. The lid assembly 134 is formed by two mating halves 134A and 134B, which cooperate to define the opening 136, which is only slightly larger in diameter than the diameter of the shaft section 26A of the valve element 26. Each half of the lid assembly 134 is formed from mild steel and lined with a suitable high temperature insulating material (not shown), such as low density refractory ceramic fiber board, for example. A ceramic fiber blanket could also be used. No special bearing material need be provided along the portions of the lid assembly 134 which confront the shaft section 26A of the valve element 26.

With regard to the output specifications of the actuator 102, if the valve assembly 20 is used only for controlling delivery of molten metal from one vessel to another in a non-pressurized environment, such as in a launder connecting a melting furnace to a separate holding furnace from which molten metal is delivered to a low pressure holding furnace, for example, the actuator 102 need only apply sufficient downward pressure to resist the hydrostatic force of the molten metal in the inlet channel 38 of the valve body 24. However, when used in low pressure casting processes at the point at which molten metal is delivered to the low pressure holding furnace, the actuator 102 must be carefully selected to provide sufficient downward pressure to resist the back pressure against the valve element 26 resulting from the application of a gas under pressure above the pool of molten aluminum in the low pressure holding furnace.

Figure 10:
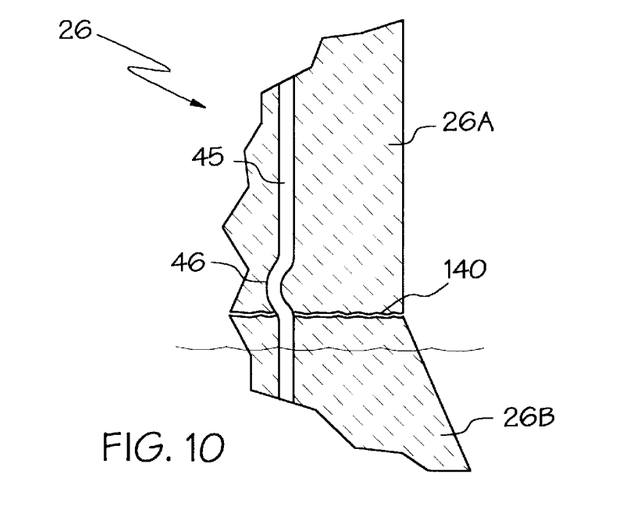
FIG. 10 is an enlarged view of the fragment of the valve element enclosed within the broken line circle 10 in FIG; 3.

Because all of the valve parts exposed to the molten aluminum are made from a castable refractory material which is immune to the well-known damaging properties of molten aluminum, a valve assembly 20 in accordance with this invention can be used for a long period, for example 70,000 cycles or more, without the need for repair or replacement. However, over long periods of use, the valve element 26 may be subjected to sufficient stress to cause a transverse stress fracture 140 in the refractory material forming the valve element 26, as shown in FIG. 10, which fracture 140 typically occurs, if at all, along the upper margin of the medial conical section 26B of the valve element 26. Although such fracturing has fortuitous benefits, as will be described below, it is desirable to ensure that the point of the fracture 140, if any, remains above the level of the molten aluminum in the valve body inlet channel 38 at all times, as best shown in FIGS. 3 and 4. Such construction prevents molten aluminum from reaching the reinforcing rod 45 in the valve element 26 which may ultimately be damaged by prolonged contact with molten aluminum.

As mentioned briefly above, the fracture 140 in the valve element 26 resulting from long periods of use has a fortuitous advantage. More particularly, the fracture 140 creates a hinge or gimbal that permits the medial section 26B and the valving section 26C of the valve element 26 to pivot, albeit slightly, about the vertical axis of the valve element 26. Consequently, as the valve element 26 is lowered against the valve seat 44, the medial section 26B and the valving section 26C of the valve element 26 may pivot slightly, as needed, to automatically ensure that the resilient sealing ring 52 in the valve element 26 is aligned with and positively engages the valve seat 44 to seal the valve port 40. Such self-alignment of the valve element 26 with the valve seat 44 is expected to provide the most benefit with valve ports 40 of relatively large diameter.

Figure 11:
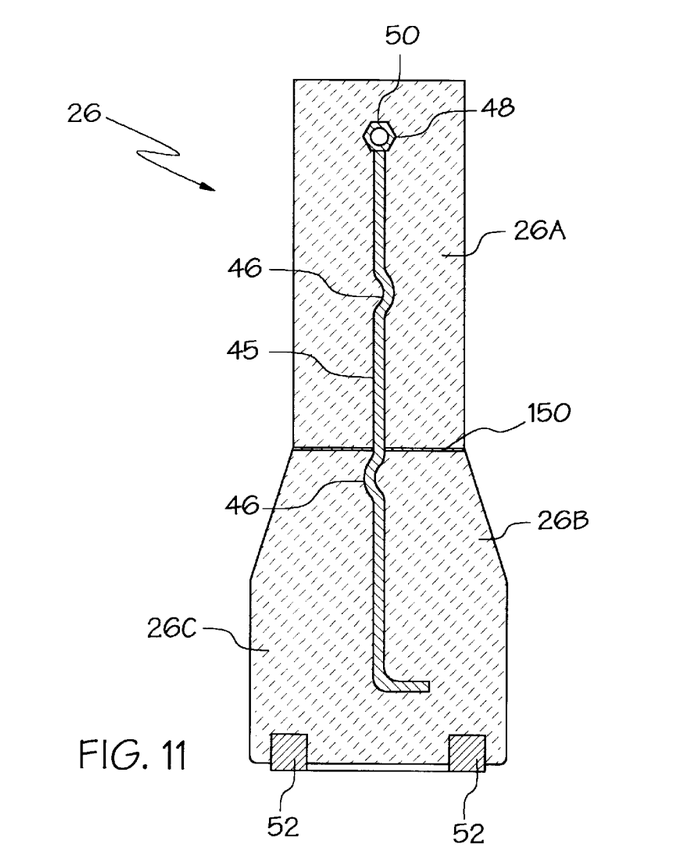
FIG. 11 is a vertical cross-sectional view similar to FIG. 8 but showing a second embodiment of a valve element in accordance with this invention.

Although the above-described pivotal movement of the medial section 26B and the valving section 26C of the valve element 26 is not necessary for acceptable operation of the valve assembly 20, it may be desirable to provide the valve element 26 with such pivotal or gimbal action during its entire life. To this end, a second embodiment of the valve element 26 is shown in FIG. 11, in which the refractory material forming the valve element 26 is initially cast or otherwise conventionally formed in two parts separated along the upper margin of the medial section 26B of the valve element 26 by a small gap or preferably a wafer 150 of commercially-available ceramic fiber paper. Consequently, the medial section 26B and the valving section 26 of the valve element 26 may pivot freely, subject to the rigidity of the reinforcing rod 45 and the dampening effects of the wafer 150, which acts as a shock absorber. Of course, if the valve element 26 is in the shape of a right circular cylinder, as shown in FIG. 12, the tendency of the valve element 26 to fracture as described above is greatly reduced. However, a gap or wafer could be provided at a suitable location along the length of the valve element 26 which remains above the level of the molten aluminum in the valve inlet channel 38. It will be understood that other suitable structures, such as a mechanical hinge, universal joint, or the like, may also be employed by one skilled in the art to provide the valve element 26 with the desired hinge or gimbal action throughout the entire life of the valve element 26.

In addition to the embodiments shown in the accompanying drawings and described above, it is contemplated that the relative locations of the valve seat 44 and the resilient sealing ring 52 may be reversed. In particular, a resilient sealing ring of ceramic fiber rope or the like may be provided around the valve port 40 and a ring-like projection may be formed at the lower end of the valve element 26. As evident, the valve element 26 could then be lowered so that the ring projecting therefrom seats against the ring of resilient sealing material surrounding the valve port 40, thereby closing the valve port 40.

Although the presently preferred embodiments of this invention have been described, it will be understood that within the purview of the invention various changes may be made within the scope of the following claims.

Having thus described our invention, we claim:

1. A method for delivering a predetermined volume of molten metal from a molten metal holding vessel to a molten metal receiving vessel via a launder extending from said holding vessel and opening to said receiving vessel, said launder including a valve assembly having a valve port defined by a portion of said valve assembly and a movable valve element, comprising:

providing said valve element with a heat-resistant, resilient sealing member confronting said valve port;

with said valve element spaced from said valve port, permitting a predetermined volume of molten metal to flow through said launder from said holding vessel to said receiving vessel; and thereafter, advancing said valve element toward said valve port until said resilient sealing member engages and is compressed against the portion of said valve assembly defining said valve port, thereby sealing said valve port and preventing the flow of additional molten metal through said launder from said holding vessel to said receiving vessel.

2. The method of claim 1 wherein said valve port is defined by an upstanding valve seat, and wherein said sealing member is compressed against said valve seat to seal said valve port.

3. The method of claim 1 wherein said receiving vessel is a low pressure holding furnace in which a gas under pressure is applied above a pool of molten metal in said holding furnace to cast a metal part.

4. The method of claim 3 further comprising the step of pressing said resilient sealing member downwardly against said valve seat with a predetermined pressure sufficient to resist upward pressure applied against said valve element as a result of the application of a gas under pressure above the pool of molten metal in said low pressure holding furnace.

5. The method of claim 1 wherein said resilient sealing member comprises non-wetting material.

6. The method of claim 5 wherein said resilient sealing member comprises ceramic fiber material.

7. The method of claim 5 wherein said resilient sealing member comprises graphite impregnated material.

8. A method for delivering a predetermined volume of molten metal from a molten metal holding vessel to a molten metal receiving vessel via a launder extending from said holding vessel and opening to said receiving vessel, said launder including a valve assembly having a valve port defined by a valve body part of said valve assembly and a valve element part, comprising:

providing one of said valve assembly parts with a valve seat confronting the other of said valve assembly parts;

providing the other of said valve assembly parts with a resilient sealing member confronting said valve seat;

with said valve element part spaced from said valve port, permitting a predetermined volume of molten metal to flow through said launder from said holding vessel to said receiving vessel; and thereafter, providing relative motion between said valve assembly parts until said resilient sealing member and said valve seat mutually engage one another and said resilient sealing member is compressed against said valve seat, thereby sealing said valve port and preventing the flow of molten metal through said launder from said holding vessel to said receiving vessel.

9. The method of claim 8 wherein said valve seat projects from said one valve assembly part toward said another valve assembly part.

10. The method of claim 8 wherein said receiving vessel is a low pressure holding furnace in which a gas under pressure is applied above a pool of molten metal in said holding furnace to cast metal part.

11. The method of claim 10 further comprising the step of pressing said resilient sealing and said valve seat together with a predetermined pressure sufficient to resist upward pressure applied against said valve element part as a result of the application of a gas under pressure above the pool of molten metal in said low pressure holding furnace.

12. The method of claim 8 wherein said resilient sealing member comprises non-wetting material.

13. The method of claim 12 wherein said resilient sealing member comprises ceramic fiber material.

14. The method of claim 12 wherein said resilient sealing member comprises graphite impregnated material.

15. A valve assembly for use in the delivery of molten metal, comprising:

a valve body part having a longitudinally-extending molten metal inlet passageway and a longitudinally-extending molten metal outlet passageway, said valve body part defining a valve port and opening from said inlet passageway to said outlet passageway;

a valve element part movable between a closed position wherein said valve element part closes said valve port while engaged with molten metal in both said inlet passageway and said outlet passageway and an open position wherein said valve element part is spaced from said valve port, said valve element part having a lower end thereof confronting said valve port; and a drive mechanism for moving said valve element part between said closed position and said open position;

said valve assembly being characterized in that one of said valve parts has a valve seat which projects toward the other of said valve parts and said other valve part comprises a heat-resistant, resilient sealing member confronting said valve seat, said valve seat on said one valve part and said resilient sealing member mutually engaging one another when said valve element part is in said closed position, thereby sealing said port and preventing the flow of molten metal from said inlet passageway to said outlet passageway.

16. The valve assembly of claim 15 wherein said one valve part comprises said valve element part and said other valve part comprises said valve body part.

17. The valve assembly of claim 16 wherein said resilient sealing member comprises ceramic fiber material.

18. The valve assembly of claim 16 wherein said resilient sealing member comprises graphite impregnated material.

19. The valve assembly of claim 15 wherein said valve element part comprises an upper portion and a lower portion, said lower portion being pivotal relative to said upper portion.

20. The valve assembly of claim 15 wherein said one valve part comprises said valve body part and said other valve part comprises said valve element part.

21. The valve assembly of claim 20 wherein said resilient sealing member comprises ceramic fiber material.

22. The valve assembly of claim 20 wherein said resilient sealing member comprises graphite impregnated material.

23. The valve assembly of claim 20 wherein said valve element part comprises an upper portion and a lower portion, said lower portion being pivotal relative to said upper portion.

24. The valve assembly of claim 15 wherein said resilient sealing member comprises non-wetting material.

25. The valve assembly of claim 1 wherein said valve port is centered about a vertical axis.

26. The valve assembly of claim 25 wherein said valve element part is movable along said vertical axis.

27. A valve assembly for use in the delivery of molten metal, comprising:
- a valve body having a molten metal inlet passageway and a molten metal outlet passageway, a portion of said valve body defining a valve port opening from said inlet passageway to said outlet passageway;
- a valve element movable between a closed position wherein said valve element closes said valve port while engaged with molten metal in both said inlet passageway and said outlet passageway and an open position wherein said valve element is spaced from said valve port, said valve element having a lower end thereof confronting said valve port, said lower end having secured thereto a heat-resistant, resilient sealing member which engages the portion of said valve body defining said valve port when said valve element is in said closed position, thereby sealing said valve port and preventing the flow of molten metal from said inlet passageway to said outlet passageway; and
- a drive mechanism for moving said valve element between said closed position and said open position.

28. The valve assembly of claim 27 wherein said valve port is defined by a raised valve seat which projects upwardly into said inlet passageway, and wherein said resilient sealing member engages said valve seat when said valve element is in said closed position.

29. The valve assembly of claim 28 wherein a gas under pressure is applied above a pool of molten metal communicating with the molten metal outlet passageway of said valve assembly, and wherein said drive mechanism, when said valve element is in said closed position, presses said valve element against said raised valve seat with a predetermined pressure sufficient to retain said valve element in said closed position when said gas under pressure is applied to said pool of molten metal.

30. The valve assembly of claim 27 wherein said resilient sealing member is formed from ceramic fiber material.

31. The valve assembly of claim 27 wherein said resilient sealing member is formed from graphite impregnated material.

32. The valve assembly of claim 27 wherein said valve element comprises an upper portion and a lower portion, said lower portion being pivotal relative to said upper portion.

33. The valve assembly of claim 27 wherein said resilient sealing member comprises non-wetting material.

34. The valve assembly of claim 27 wherein said valve port is centered about a vertical axis.

35. The valve assembly of claim 34 wherein said valve element is movable along said vertical axis.

36. A valve element for use in a valve assembly having a valve port centered about a vertical axis and defined by a portion of a valve body forming part of said valve assembly, said valve assembly adapted for use in the delivery of molten metal from one vessel to another vessel, said valve element comprising:
- a vertically-movable valve element body having a lower end having a recessed channel adapted to confront a valve port to be sealed; and
- a heat-resistant, resilient sealing member secured within said recessed channel, said sealing member being adapted to engage the portion of said valve body defining said valve port when said valve element to thereby seal said valve port.

37. The valve element of claim 36 wherein said sealing member comprises non-wetting material.

38. The valve element of claim 37 wherein said sealing member comprises ceramic fiber material.

39. The valve element of claim 37 wherein said sealing member comprises graphite impregnated material.

40. The valve element of claim 36 wherein said valve element body is formed from castable refractory material.

41. The valve element of claim 36 wherein said valve element body has means for connecting said valve element body to a valve element drive mechanism.

* * * * *